(12) United States Patent  (10) Patent No.: US 6,657,654 B2
Narayanaswami  (45) Date of Patent: Dec. 2, 2003

(54) CAMERA FOR USE WITH PERSONAL DIGITAL ASSISTANTS WITH HIGH SPEED COMMUNICATION LINK

(75) Inventor: Chandrasekhar Narayanaswami, Wilton, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/069,264

(22) Filed: Apr. 29, 1998

(65) Prior Publication Data

US 2001/0013890 A1 Aug. 16, 2001

(51) Int. Cl.$^7$ .......................... H04N 7/14; H04N 5/225
(52) U.S. Cl. ................. 348/14.04; 348/207.1; 455/556.2; 710/303
(58) Field of Search ............................. 348/14–15, 158, 348/207, 231, 373, 552, 211, 232; 455/90, 349, 556–558, 575, 550; 379/93.21, 202, 100.01; 709/200, 204; 708/109; 713/320; 361/683, 686; 710/303, 13; 358/471; 235/375; 600/322

(56) References Cited

U.S. PATENT DOCUMENTS

| | | | |
|---|---|---|---|
| 5,495,581 A | * 2/1996 | Tsai | 379/100.01 |
| 5,606,594 A | * 2/1997 | Register et al. | 455/90 |
| 5,666,159 A | * 9/1997 | Parulski et al. | 348/211 |
| 5,675,524 A | * 10/1997 | Bernard | 361/683 |
| 5,748,441 A | * 5/1998 | Loritz et al. | 348/552 |
| 5,768,163 A | * 6/1998 | Smith, II | 348/373 |
| 5,815,201 A | * 9/1998 | Hashimoto et al. | 348/232 |
| 5,822,546 A | * 10/1998 | George | 710/303 |
| 5,867,218 A | * 2/1999 | Matsuzaki et al. | 348/373 |
| 5,917,545 A | * 6/1999 | Kowno et al. | 348/373 |
| 5,926,208 A | * 7/1999 | Noonen et al. | 348/14.1 |
| 6,009,336 A | * 12/1999 | Harris et al. | 600/322 |
| 6,009,529 A | * 12/1999 | Park | 713/320 |
| 6,091,453 A | * 7/2000 | Coan et al. | 348/373 |
| 6,102,284 A | * 8/2000 | Myers et al. | 235/375 |
| 6,292,272 B1 | * 9/2001 | Okauchi et al. | 358/471 |

\* cited by examiner

*Primary Examiner*—George Eng
(74) *Attorney, Agent, or Firm*—Robert M. Trepp; F. Chau & Associates, LLC

(57) ABSTRACT

An attachment apparatus for a handheld computer having a display in accordance with the present invention includes an attachment portion for receiving and securing the handheld computer. A camera assembly mounts to the attachment portion for providing images to the handheld computer, and an interface electrically connects the handheld computing device to the camera assembly for transferring the image data to be displayed on the display of the handheld computer.

32 Claims, 6 Drawing Sheets

CAMERA FOR USE WITH PERSONAL DIGITAL ASSISTANTS WITH HIGH SPEED COMMUNICATION LINK

BACKGROUND OF THE INVENTION

1. Field of the Invention

The present invention relates to capturing images and, more particularly, to a camera assembly for use with personal digital assistants for capturing and transmitting video and still images.

2. Description of the Related Art

Mobile communications has increased enormously over the past several years. As a result business and personal users have become increasingly reliant on cellular phones, personal digital assistants (PDA), pagers, wireless FAX modems for use with laptop computers, etc.

Several portable devices have become more popular due to their functionality and reduced size. The most notable example is a personal digital assistant (PDA). These devices store addresses, calendars, phone lists, memos, email messages, etc., and some can also access the Internet. The PDA's dock into a cradle or attachment for connection to a more powerful computer for synchronizing data and performing other functions.

The PDA may include a touch sensitive LCD panel, some buttons to directly access calendars, phone lists, addresses, memos, scroll up, scroll down, a port to connect to the cradle and other regular circuitry such as a CPU, memory and software applications. The touch sensitive panel can be tapped to directly access information or to enter script or handwritten text with a stylus. The display panel may also include a backlight to make text or images on the display more readable in dark conditions. The cradle includes a serial port interface cable that can connect to a personal computer (PC) or other device, and a button for synchronization of data between the PDA and PC.

The cradle also physically attaches to the PDA. Information such as schedules, expense reports, phone lists, etc., and programs can be shipped from the PDA to the PC and vice-versa. The software ensures that changes made on the PDA and changes made on the PC can be combined to create the latest version of an information file. For example, if a first telephone list of phone numbers is stored in the PC and a second list is stored on the PDA the two lists may be synchronized with software to create a single comprehensive list which can be stored on the PC, the PDA or both.

The PDA inserts into the cradle which is connected to the serial port of the PC. When the synchronization button is pressed on the PDA (or the software command to synchronize is issued via the software running on the PC), the version of phone list on the PDA is uploaded to the PC and this version is compared with the version of the phone list on the PC. Differences are reconciled and changes are sent to the version on the PDA, and the list on the PC is also updated. In this way, data remains synchronized between the PDA and the PC.

Referring to FIG. 1, a conventional PDA 10 is shown. PDA 10 includes a housing 12 configured to provide a display 14 and control buttons 16. Housing 12 provides a structure for coupling PDA 10 to an interface adapter or a cradle 20. Cradle 20 includes guide supports 22 for receiving PDA 10 therebetween and detachably securing PDA 10. PDA 10 includes an interface 24 for coupling a connector 26 of cradle 20 thereto. Connector 26 further connects to a PC (not shown).

As devices, such as handheld PC's, are commercially introduced capabilities are increased for individuals on the road or otherwise working away from a conventional office. One of the drawbacks of current versions of handheld PC's is that the handheld PC's have limited memory, usually 1–2 MB, and the connection speed, while adequate for calendar and memo synchronization, falls short for several applications. Another drawback is that often users would like to have the capabilities generally provided by a modem, a digital scanner, a digital camera, videophone, etc., with their PDA, thus increasing the bulk they need to carry. To provide these capabilities, the individual devices must be purchased and be capable of interfacing with each other. The overall cost also increases because the user pays for duplication, e.g., two devices with displays.

Therefore, a need exists for a camera which attaches into a cradle of a PDA coupled with a high speed connection to a computer for providing still and video images while avoiding the cost and device duplication of conventional equipment.

SUMMARY OF THE INVENTION

An attachment apparatus for a handheld portable computer device having a display in accordance with the present invention includes an attachment portion for receiving and securing the handheld computer. A camera assembly mounts to the attachment portion for providing images to the handheld computer, and means for coupling the handheld computer to the camera assembly for transferring the image data to be displayed on the display of the handheld computer.

In alternate embodiments of the attachment apparatus, the attachment portion is adjustable to receive handheld computers of different sizes. The means for coupling includes a connector mounted on the attachment portion for engaging an interface on the handheld computer. The handheld computer may be a personal digital assistant. The attachment portion may include a stand for supporting the attachment portion. A rotating lens portion of the camera assembly may be included for rotating a lens of the camera assembly.

Another image capture system for use with handheld computing devices having a display includes a cradle for detachably receiving and securing the handheld computing device. The cradle includes a camera assembly for providing image data to the handheld computing device. A data link couples the handheld computing device to a computer for processing image data received by the camera assembly in the handheld computing device and transmitting the image data to the computer.

In alternate embodiments of the image capture system, the cradle is adjustable to receive hand held computing devices of different sizes. The data link may include a cable which may provide data transfer at a rate of at least 12 Mbits/sec. The data link may include a wireless link. The handheld computing device may be a personal digital assistant. The cradle may include a stand for supporting the cradle and the computing device. A rotating lens portion of the camera assembly may be included for rotating a lens for capturing images. The computing device may perform image compression and processing. The cradle may include a power connection for providing power to the camera assembly and the computing device. The cradle may also include a power source, for example, batteries, to provide power to the handheld computing device and/or the camera assembly. The computer may be linked to a communications network for transmitting and receiving images over the network.

A video conferencing and still image capture system in accordance with the present invention includes a personal digital assistant (PDA), a cradle for detachably receiving and securing the PDA for interfacing with a computer, a camera assembly adjustably attached to the cradle having an imager for providing video and still image data to the PDA for image processing and a data cable coupling the cradle to the computer for connecting the PDA to the computer for transmitting and receiving the video and still image data over a communications network.

In alternate embodiments of video conferencing and still image capture system, the cradle is adjustable to receive handheld computing devices of different sizes. The data cable provides data transfer at a rate of at least about 12 Mbits/sec. The cradle may include a stand for supporting the cradle and the computing device. A rotating lens portion of the camera assembly may be included for rotating a lens thereabout for capturing images. The PDA preferably performs image compression and processing. The cradle may include a power connection for providing power to the camera assembly and the PDA. The cradle may also include a power source, for example, batteries, to provide power to the handheld computing device and/or the camera assembly.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention relates to capturing images and, more particularly, to a camera for use with personal digital assistants (PDA) for capturing and transmitting video and still images. Handheld PC's and personal digital assistants are used interchangeably throughout this disclosure. The present invention describes a still and video camera that is attached to a PDA and incorporates a high speed communication link between the PDA and a processor, such as a PC. The camera has an adjustable portion which may be rotated into a plurality of positions relative to the PDA. The present invention facilitates typical photography applications, for example, taking a still image or video application, such as, video conferencing applications where there is no active photographer and the lens is faced toward a subject or subjects. The captured image is displayed on a display panel available on the PDA. The camera can be used to take regular pictures and also to scan documents or whiteboards.

Referring now in specific detail to the drawings, it should be understood that the elements shown in the FIGS. may be implemented in various forms of hardware, software or combinations thereof. Preferably, these elements are implemented in hardware on one or more appropriately functioning circuit boards which may include programmed general purpose processors, memory and input/output interfaces.

Figure 1:
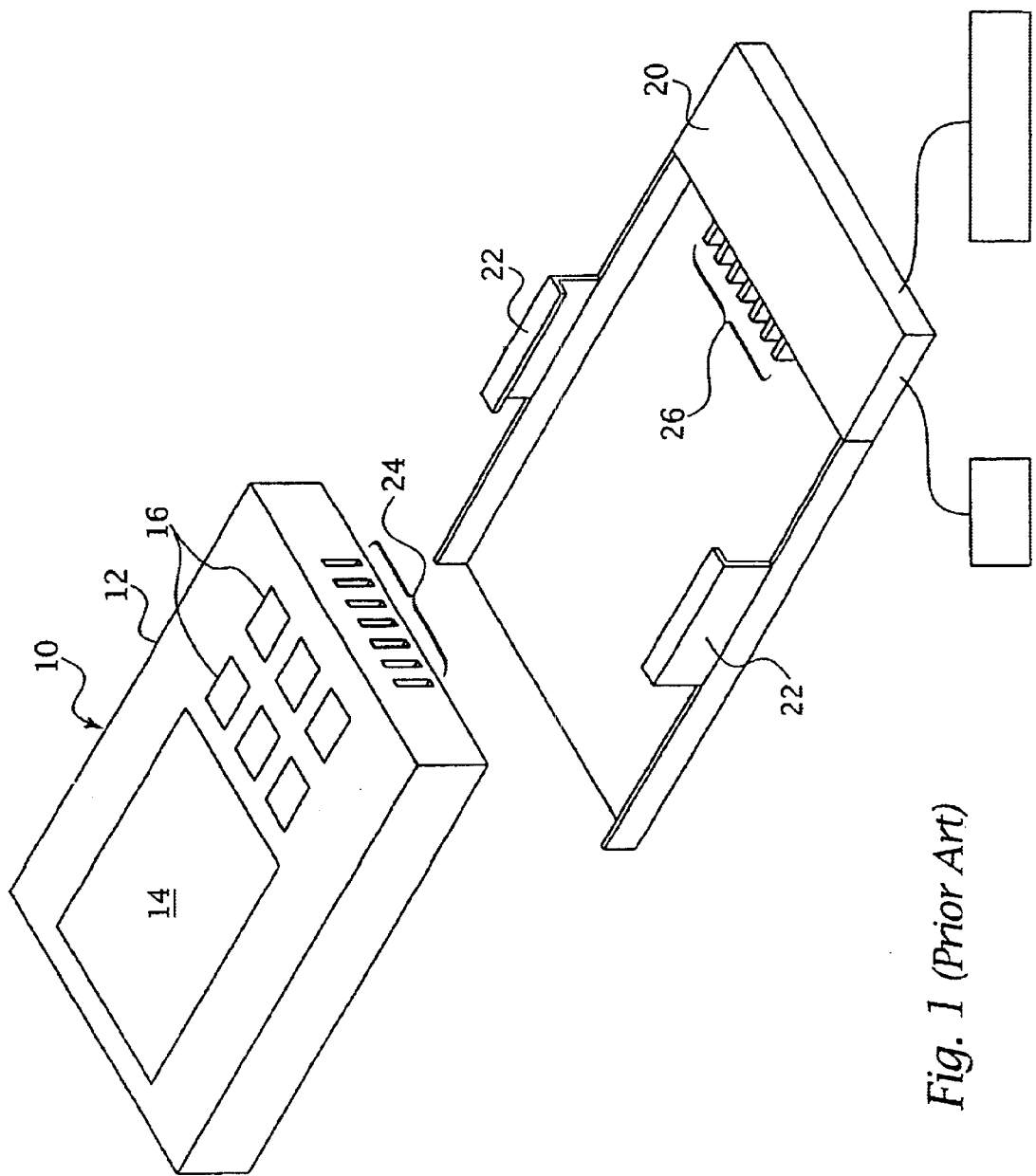
FIG. 1 is a perspective view of a conventional PDA and cradle attachment.
Figure 2:
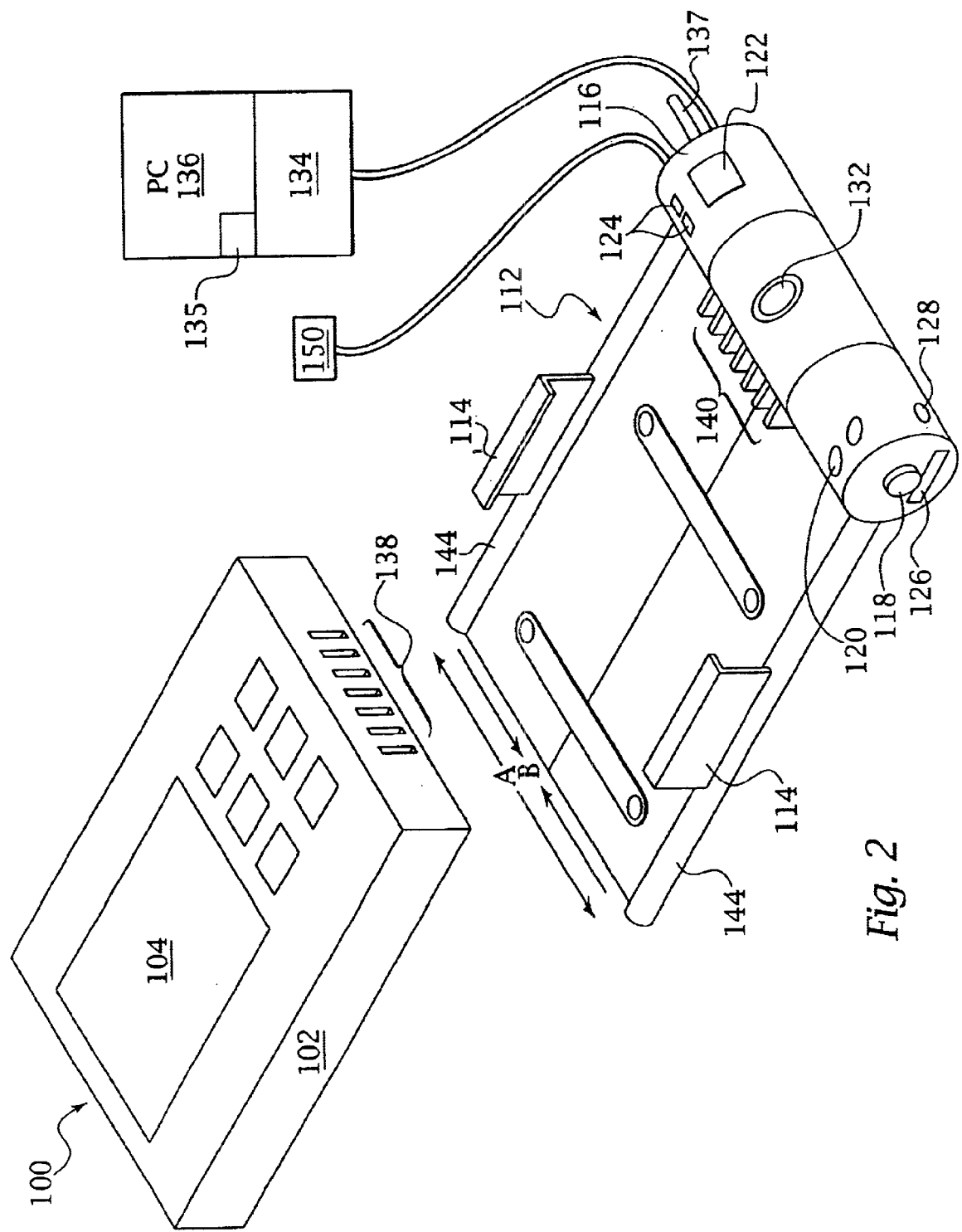
FIG. 2 is a perspective view of a system including a PDA and a cradle having a camera assembly in accordance with the present invention.

Referring to FIG. 2, a system is shown which includes a PDA 100 and an interface adapter or a cradle 112 having a camera assembly 116 in accordance with the present invention. PDA 100 includes a housing 102 configured for providing a display 104 and control buttons 106 as described above. Housing 102 provides a structure for coupling PDA 100 to cradle 112. Cradle 112 includes tabs 114 for receiving PDA 100 therebetween and detachably securing PDA 100.

Cradle 112 includes a camera assembly 116 incorporated therein. Camera assembly 116 provides video and still images in conjunction with PDA 100. By incorporating camera assembly 116 into cradle 112, a user does not need to duplicate equipment by carrying a camera as well as a PDA. The size of the PDA remains the same. A display panel normally included in digital cameras is eliminated by sharing display 104 of PDA 100.

Cradle 112 is provided with camera controls and devices. Included are a shutter release 118, a zoom control 120, a flash 122 and flash mode controls 124, a clock 126 with date and time, a slot for tripod attachment 128, a lens 132 or any other useful features known to those skilled in the art.

A high speed communication cable 134 is used to transfer data, programs and images from camera assembly 116 and PDA 100 to a PC 136 and vice-versa. In preferred embodiments, cable 134 includes a Universal Serial Bus (USB) or IEEE 1394 Firewire. The high speed USB or IEEE1394 or other cable connection allows rapid transfer of data between PC 136 and PDA 100 and camera assembly 116. In other embodiments, a wireless communication link may be established between the cradle 112 and PC 136. Cradle 112 includes an antenna 137 for transmitting and receiving data form PC 136 which includes a wireless transmitter/receiver 135 for transmitting and receiving wireless signals, for example radio frequency signals, from the cradle 112 and PDA 100. Wireless communication between cradle 112 and PC 136 is preferably established when cable 134 is not available or PC 136 is configured for wireless communications only. It is further contemplated that the wireless communications capability of PDA 100 may be used to communicate with PC 136 instead of providing a separate antenna and circuitry for transmitting data from cradle 112.

PDA 100 includes an interface 138 for coupling a connector 140 of cradle 112 thereto. Connector 138 further connects to PC 136. When a faster connection link is used for cable 134, such as the Universal Serial Bus (USB) which can transfer data at 12 Mbits/sec or IEEE 1394 Firewire which can transfer data at 400 Mbits/sec, increased functionality is achieved. When bandwidth of this magnitude is available, PDA 100 is more versatile, and is capable of enhanced performance and more features. For example, PDA 100 may implement an additional set of applications when the user has a PC available. For example, a faster connection link provides for data in PDA 100 to be synchronized at an increased rate. The increased synchronization rate permits downloading of programs and data which transform the PDA 100 into a more powerful computing and storage device.

Dimensions of cradle 112 are adjustable so that cradle 112 may be adapted to a variety of PDAs which usually vary in their dimensions. Tabs 114 are provided to hold or securely mount PDA 100 to cradle 112. Cradle 112 adjusts by releasing a locking mechanism (not shown) to permit sides 144 to translate relative to each other as indicated by arrows "A" and "B" in FIG. 2. This allows for different PDAs to be used in cradle 112.

Figure 3:
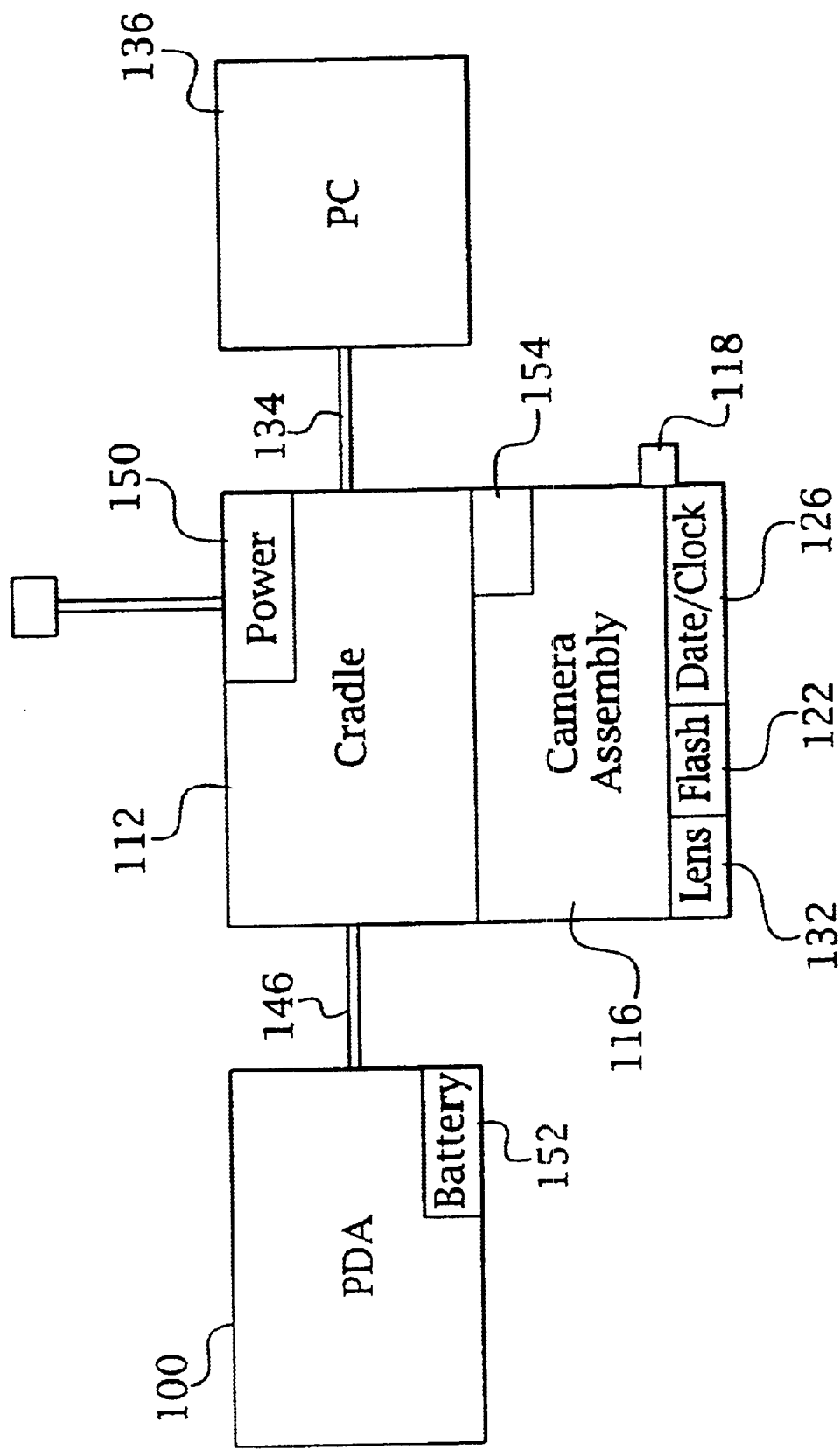
FIG. 3 is a block diagram for the system of FIG. 2 showing connections between components in accordance with the present invention.

Referring to FIG. 3, PDA 100 includes batteries 152 for power. PDA 100 further includes a device specific cable 146 for connecting PDA 100 to cradle 112 with camera assembly 116. Cradle 112 and/or camera assembly 116 may include batteries 154 for powering camera assembly 116 and/or PDA 100 so as to not drain batteries 152 of PDA 100. Alternatively, batteries 152 may be used for supplying power to camera assembly 116. Cradle 112 also includes a power adapter 150 for connecting to a power outlet so that batteries 152 and/or 154 can be conserved, or to recharge the batteries if desired.

Figure 4:
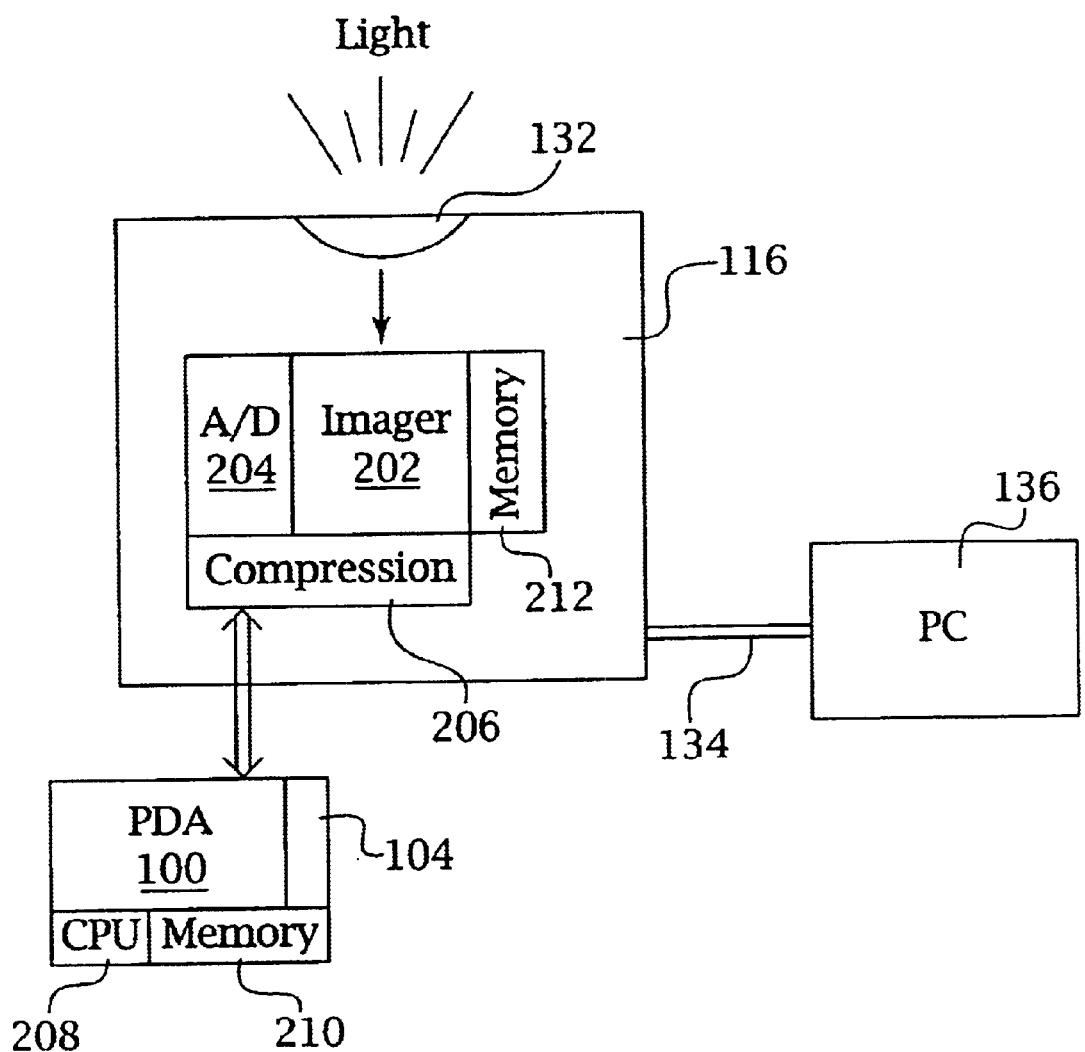
FIG. 4 is a block diagram for the system of FIG. 2 showing greater detail of the camera assembly in accordance with the present invention.

Referring to FIG. 4, camera assembly 116 includes electronics having components found in digital cameras, such as an imager chip 202 that captures light and converts it into analog signals, an analog to digital converter 204, and an image compressor 206 which can either be implemented in the hardware of cradle 112, camera assembly 116 or PDA 100. Since the connection between cradle 112 and PDA 100 is close, data can be transmitted therebetween at higher rates and therefore compression is preferably employed on PDA 100.

By utilizing the power of a CPU 208 in PDA 100 for compression, circuitry needed in camera assembly 116 is greatly reduced and therefore cost is reduced as well. The present invention eliminates the need for a separate display on camera assembly 116, memory within camera assembly 116 and the need for compression circuitry within camera assembly 116. Software stored in memory 212 of PDA 100 may be used to manipulate an image acquired by camera assembly 116 to perform operations such as changing size, aspect ratio, cropping, changing colors and brightness and other special effects such as solarization, making negatives, deleting images, annotating images, etc.

Camera assembly 116 permits capturing video or still images. In the still camera mode, the pictures are stored within memory 210 on PDA 100 to better utilize resources and minimize camera costs, although camera assembly 116 may be provided with its own memory storage 212. Display 104 of PDA 100 is used to preview the picture before it is taken and also to review it as soon as the picture is taken.

In a particularly useful embodiment, camera assembly 116 and PDA 100 are used for video conferencing. In the video conferencing mode, the picture of the subject will appear on display 104 of PDA 100. In this mode, the image data is transferred from camera assembly 116 to display 104 on PDA 100 and may also be transferred to PC 136 via cable 134. Software on PC 136 functions to perform the video conferencing tasks such as transmitting and receiving images over an Internet connection or a phone line, dialing up and initialization, selection of frame size and frame rate, etc.

Figure 5:
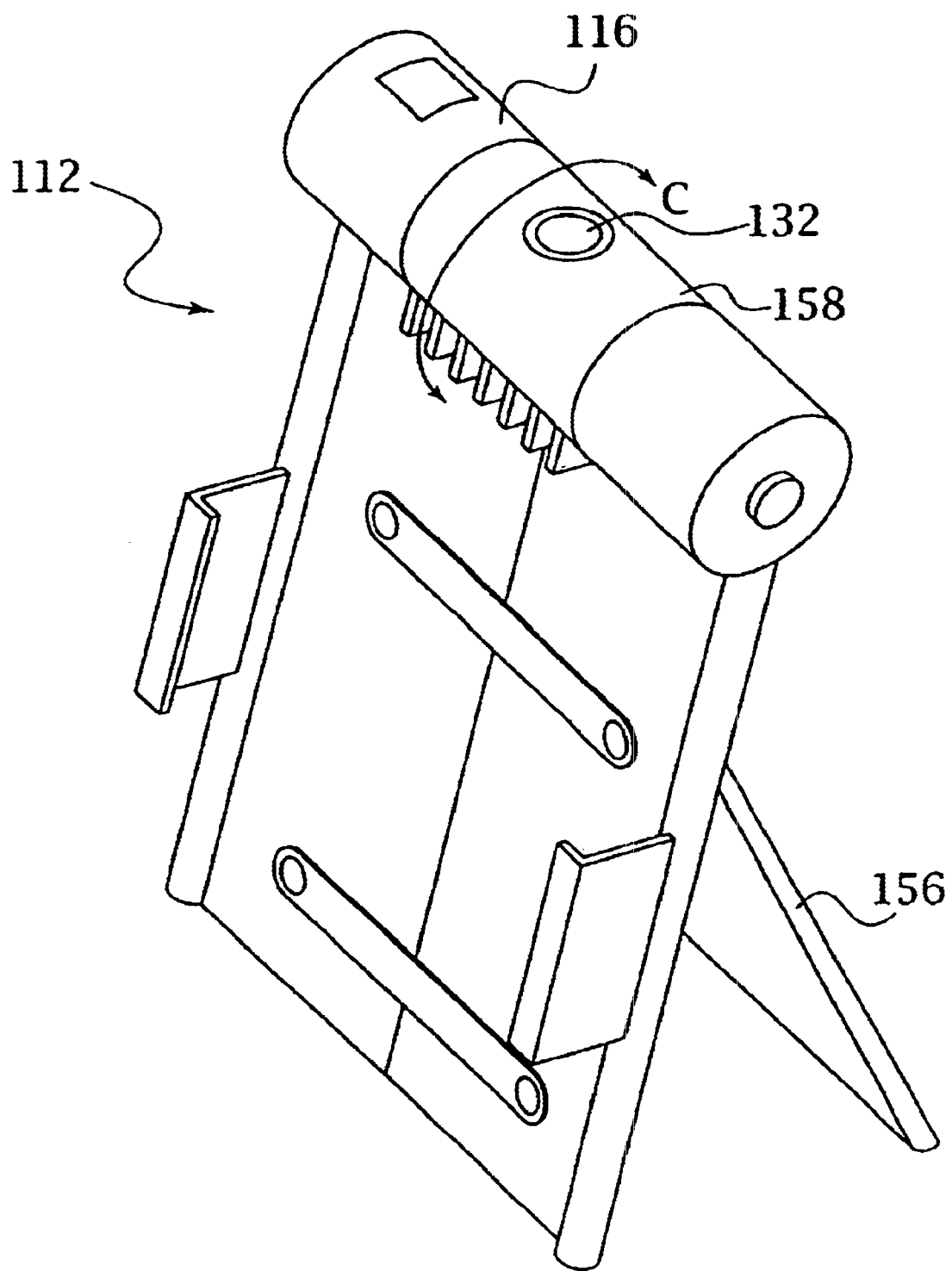
FIG. 5 is a perspective view of the system of FIG. 2 showing an adjustable stand and an adjustable lens in accordance with the present invention.
Figure 6:
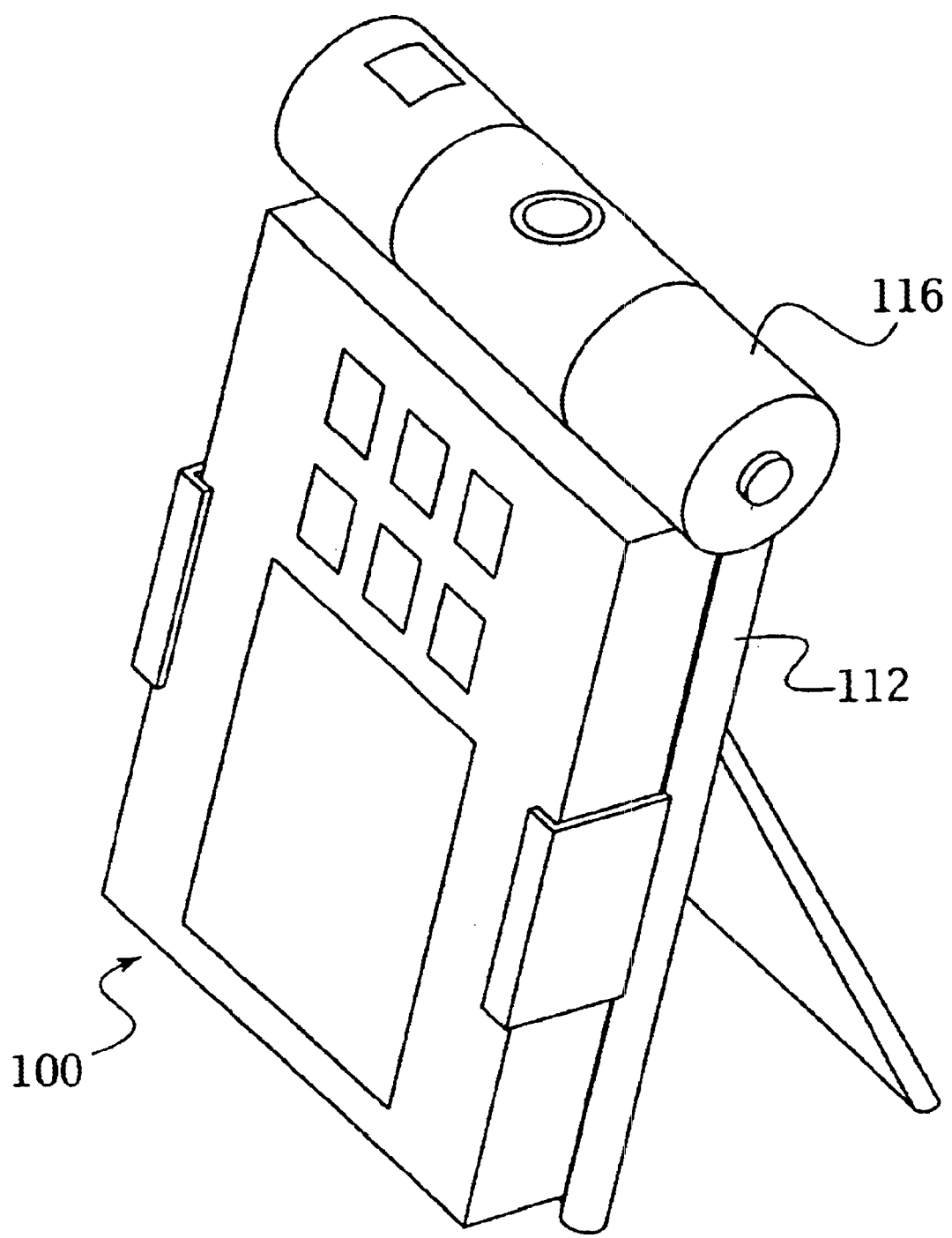
FIG. 6 is a perspective view of the system of FIG. 2 showing the PDA installed on the cradle in accordance with the present invention.

Referring to FIG. 5, cradle 112 includes a stand 156 which is adjustable to permit variation in the angle at which cradle 112 rests on a surface. Camera assembly 116 further includes an adjustable positioner 158 for adjusting lens 132. Positioner 158 permits rotation of lens 132 to allow versatility in capturing images. For example, lens 132 of camera assembly 116 may be rotated to either face the user or face away from the user. In one embodiment, camera assembly 116 permits at least 180 degrees of rotation for lens 132. Arrow "C" indicates the direction of rotation. As shown in FIG. 6, PDA 100 is installed within cradle 112 for use as a camera in accordance with the present invention. PDA 100 and cradle 112 may preferably have the same color and/or physical attributes to provide for a more uniform appearance therebetween.

Having described preferred embodiments of a novel camera assembly for use with personal digital assistants with high speed communication link (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. An attachment apparatus for a personal digital assistant (PDA) having a display comprising:

a cradle dimensioned and configured for receiving and adjustably securing the PDA, the cradle having an electrical interface to connect to the PDA when securing the PDA in the cradle;

a camera assembly incorporated in the cradle, the camera assembly having a camera for capturing video images and transferring video and still images to said PDA through the electrical interface, the camera assembly having a lens and controls for selectably moving the lens into a plurality of positions.

2. The attachment apparatus as recited in claim 1, wherein the cradle is adjustable to receive personal digital assistances of different sizes.

3. The attachment apparatus as recited in claim 1, wherein the electrical interface includes a connector mounted on the cradle for engaging an interface on the PDA.

4. The attachment apparatus as recited in claim 1, wherein the cradle includes a stand for supporting the cradle.

5. The attachment apparatus as defined in claim 1 wherein said camera assembly further includes a digital camera which comprises an imager chip, an analog to digital converter, image compressor, and memory chip.

6. The attachment apparatus as recited in claim 1, wherein said camera assembly has a lens, and the camera assembly further comprises:

a shutter release;

a clock with date and time;

a set of controls to allow the lens to either zoom in or zoom out;

a flash;

a set of flash mode controls; and a means for connecting a tripod to said camera assembly.

7. An image capture system for use with pocket-size computing devices having a display comprising:

a cradle dimensioned and configured for detachably receiving and adjustably securing the pocket-size computing device, the cradle including a camera assembly being built into the cradle for providing image data to the pocket-size computing device;

the camera assembly having a lens and controls for selectably moving the lens into a plurality of positions; and a data link attached to the cradle and coupling the computing device to a computer for processing image data received by the camera assembly in the computing device and transmitting the image data to the computer.

8. The system as recited in claim 7, wherein the cradle is adjustable to receive handheld computing devices of different sizes.

9. The system as recited in claim 7, wherein the data link includes a cable.

10. The system as recited in claim 9, wherein the cable provides a data transfer rate of about at least 12 Mbits/sec.

11. The system as recited in claim 7, wherein the hand held computing device is a personal digital assistant.

12. The system as recited in claim 7, wherein the cradle includes a stand for supporting the cradle and the computing device.

13. The system as recited in claim 7, wherein the data link includes a wireless data link.

14. The system as recited in claim 7, wherein the computing device performs image compression and processing.

15. The system as recited in claim 7, wherein the cradle includes a power connection for providing power to the camera assembly and the computing device.

16. The system as recited in claim 7, wherein the computer is linked to a communications network for transmitting and receiving images over the network.

17. The system as recited in claim 7, wherein the cradle includes a power source for providing power to the camera assembly.

18. The system as recited in claim 7, wherein the cradle includes a power source for providing power to the computing device.

19. An image capture system as recited in claim 7, wherein said camera assembly has a lens, and the camera assembly further comprises:

a shutter release;

a clock with date and time;

a set of controls to allow the lens to either zoom in or zoom out;

a flash;

a set of flash mode controls; and a means for connecting a tripod to said camera assembly.

20. A video conferencing and still image capture system comprising:

a personal digital assistant (PDA);

a cradle dimensioned and configured for receiving and adjustably securing the PDA for interfacing with a computer;

a camera assembly incorporated in the cradle, the camera assembly including an imager for providing video and still image data to the PDA for image processing;

the camera assembly having a lens and controls for selectably moving the lens into a plurality of positions; and a data cable coupling the cradle to the computer for connecting the PDA to the computer for transmitting and receiving the video and still image data over a communications network.

21. The system as recited in claim 20, wherein the cradle is adjustable to receive handheld computing devices of different sizes.

22. The system as recited in claim 20, wherein the data cable provides data transfer at a rate of at least about 12 Mbits/sec.

23. The system as recited in claim 20, wherein the cradle includes a stand for supporting the cradle and the computing device.

24. The system as recited in claim 20, wherein the PDA performs image compression and processing.

25. The system as recited in claim 20, wherein the cradle includes a power connection for providing power to the camera assembly and the PDA.

26. The system as recited in claim 20, wherein the cradle includes a power source for providing power to the camera assembly.

27. The system as recited in claim 20, wherein the cradle includes a power source for providing power to the computing device.

28. A video conferencing and still image capture system as recited in claim 20, wherein said camera assembly has a lens, and the camera assembly further comprises:

a shutter release;

a clock with date and time;

a set of controls to allow the lens to either zoom in or zoom out;

a flash;

a set of flash mode controls; and a means for connecting a tripod to said camera assembly.

29. A camera with an attachment apparatus for a personal digital assistant (PDA) having a display comprising:

a cradle incorporated into the camera for receiving and adjustably securing the PDA, the camera for providing image data to the PDA;

the camera having a lens and controls for selectively moving the lens into a plurality of positions; and an interface adapted for coupling the PDA to the camera to enable image viewing and for transferring image data to be displayed on the display of the PDA, wherein the cradle is adjustable to receive PDAs of different sizes.

30. The camera as recited in claim 29, wherein the interface includes a connector mounted on the cradle for engaging an interface on the PDA.

31. The camera as recited in claim 29, wherein the camera includes a stand for supporting the camera.

32. The camera with an attachment apparatus as recited in claim 29, wherein said camera assembly has a lens, and the camera further comprises:

a shutter release;

a clock with date and time;

a set of controls to allow the lens to either zoom in or zoom out;

a flash;

a set of flash mode controls; and a means for connecting a tripod to said camera assembly.

* * * * *